(12) United States Patent
Yang et al.

(10) Patent No.: US 8,407,229 B2
(45) Date of Patent: Mar. 26, 2013

(54) SYSTEMS AND METHODS FOR AGGREGATING SEARCH RESULTS

(75) Inventors: Tao Yang, Santa Barbara, CA (US); Wei Wang, East Brunswick, NJ (US)

(73) Assignee: IAC Search & Media, Inc., Oakland, CA (US)

( * ) Notice: Subject to any disclaimer, the term of this patent is extended or adjusted under 35 U.S.C. 154(b) by 555 days.

(21) Appl. No.: 11/524,011

(22) Filed: Sep. 19, 2006

(65) Prior Publication Data
US 2008/0071742 A1  Mar. 20, 2008

(51) Int. Cl.
*G06F 7/00* (2006.01)
*G06F 17/30* (2006.01)
(52) U.S. Cl. ...................................................... 707/748
(58) Field of Classification Search ........... 707/999.003, 707/999.107, 999.101, 748
See application file for complete search history.

(56) References Cited

U.S. PATENT DOCUMENTS

| | | | | |
|---|---|---|---|---|
| 6,408,093 | B1 * | 6/2002 | Hu et al. | 382/219 |
| 2003/0187839 | A1 * | 10/2003 | Zhang et al. | 707/4 |
| 2006/0200455 | A1 * | 9/2006 | Wilson | 707/4 |
| 2007/0038601 | A1 * | 2/2007 | Guha | 707/3 |

* cited by examiner

*Primary Examiner* — Alexey Shmatov
(74) *Attorney, Agent, or Firm* — Stephen M. De Klerk (57) ABSTRACT

Systems and methods for aggregating search results are disclosed herein. The systems and methods include receiving a user search query, analyzing the user search query to identify a plurality of properties of the user search query, identifying a plurality of search results that match the user search query, each search result being based on a different scheme, and aggregating the search results to produce a search results list. The search results list may be a combined and selected results list. Feedback-based optimization is also disclosed.

18 Claims, 8 Drawing Sheets

SYSTEMS AND METHODS FOR AGGREGATING SEARCH RESULTS

BACKGROUND OF THE INVENTION

1). Field of the Invention

This invention relates to the field of search engines and, in particular, to systems and methods for aggregating search results.

2). Discussion of Related Art

The Internet is a global network of computer systems and websites. These computer systems include a variety of documents, files, databases, and the like, which include information covering a variety of topics. It can be difficult for users of the Internet to locate information on the Internet. Search engines are often used by people to locate information on the Internet.

The user of the search engine enters a search query on a website connected to the search engine via the Internet. The search engine returns results matching the search query, which are typically ranked based on relevancy.

However, multiple users entering the same search query may be searching for different information. For example, first and second users may both enter "CMU" as their search query and receive the same results; however, the first user may be searching for information about Carnegie Mellon University, while the second user may be searching for information about Central Michigan University.

Ranking of search results is determined using a ranking algorithm and each search engine typically uses a different ranking algorithm. Often, results that include content with rich link topology on the web are ranked higher, while results with weak link support (even though they may be more relevant to the search query) are ranked lower. Combining results from different search engines is used in meta-search web sites, but these meta-search web sites do not have access to inside data/ranking schemes from the search engines for well-informed decisions.

SUMMARY OF THE INVENTION

A method for aggregating search results is described herein. The method includes receiving a user search query; analyzing the user search query to identify a plurality of properties of the user search query; identifying a plurality of search results that match the user search query, each search result being based on a different scheme utilizing the search query; determining a relevance factor for each scheme; and aggregating the search results from each scheme to produce a search results list.

Analyzing the user search query to identify a plurality of properties may include identifying concepts that differentiate attributes of the query.

Analyzing the user search query to identify a plurality of properties may include matching the user search query to keywords of the databases.

Analyzing the user search query to identify a plurality of properties may include identifying documents in the databases that match the user search query; comparing the number of documents that match the user search query with the total number of results in the database to produce a content ratio hit; and if the content hit ratio exceeds a threshold, then determining the user search query has the property of the database.

The properties may be selected from the group consisting of location, time, commerce, news, language and homepage. Some of the properties can be derived or optimized through query log analysis.

The user search query may be a natural language query.

Aggregating the search results to produce a search results list may include dividing each of the search results from each database into a plurality of zones; combining each of the search results from each database in each zone; and combining the search results from each zone.

The method may also include providing the search results list to a user.

The method may also include optimizing the aggregation and ranking of search results that match a search query with user feedback.

Optimizing aggregation of search results may include assessing a user's satisfaction with a ranking scheme.

Optimizing ranking of search results may include assessing a user's satisfaction with a document in the search results list.

Each scheme may have a database associated therewith.

A search system is described herein. The search system includes a search engine to receive a user search query; a plurality of databases to store a plurality of search results, each database related to a scheme; and a server to analyze the search query to identify a plurality of properties of the search query, match the user search query with search results in the plurality of databases based on the plurality of properties and aggregate the search results from each of the plurality of databases to produce a search results list.

The search engine may be further to provide the search results list to a user.

The plurality of databases may each have one of the plurality of properties associated therewith.

The server may be further to divide each of the search results from each database into a plurality of zones, combine each of the search results from each database in each zone, and combine the search results from each zone.

A method of integrating multiple ranking strategies is described herein. The method includes matching a user search query with a plurality of databases, each database relating to one of a plurality of properties and a ranking scheme; producing a list of search results matching the query ranked according to the ranking scheme; and aggregating the list of search results from each database to produce a final search results list; and presenting the final search results list to a user.

The method may also include dividing each of the search results from each database into a plurality of zones; combining each of the search results from each database in each zone; and combining the search results from each zone.

The method may also include optimizing the aggregation of search results that match a search query with user feedback.

Optimizing the aggregation of search results that match a search query with user feedback may include assessing a user's satisfaction with a ranking scheme or assessing a user's satisfaction with a document in the search results list.

BRIEF DESCRIPTION OF THE DRAWINGS

The invention is described by way of example with reference to the accompanying drawings, wherein.

DETAILED DESCRIPTION OF THE INVENTION

Figure 1:
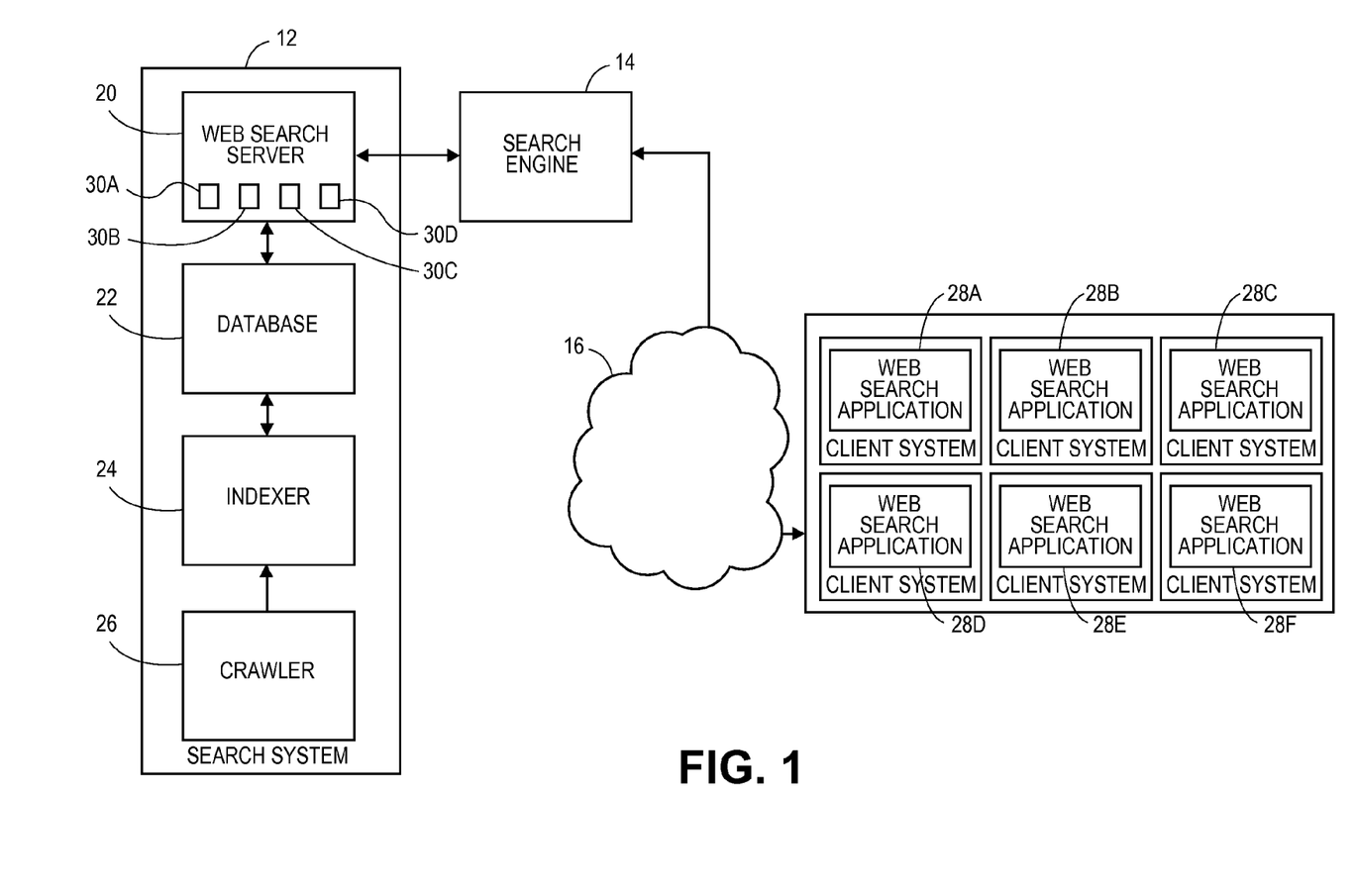
FIG. 1 is a block diagram illustrating a system for searching in accordance with one embodiment of the invention.

FIG. 1 of the accompanying drawings shows a network system 10 which can be used in accordance with one embodiment of the present invention. The network system 10 includes a search system 12, a search engine 14, a network 16, and a plurality of client systems 18. The search system 12 includes a server 20, a database 22, an indexer 24, and a crawler 26. The plurality of client systems 18 includes a plurality of web search applications 28a-f, located on each of the plurality of client systems 18. The server 20 includes a plurality of databases 30a-d.

The server 12 is connected to the search engine 14. The search engine 14 is connected to the plurality of client systems 18 via the network 16. The server 20 is in communication with the database 22 which is in communication with the indexer 24. The indexer 24 is in communication with the crawler 26. The crawler 26 is capable of communicating with the plurality of client systems 18 via the network 16 as well.

The web search server 20 is typically a computer system, and may be an HTTP server. It is envisioned that the search engine 14 may be located at the web search server 20. The web search server 20 typically includes at least processing logic and memory.

The indexer 24 is typically a software program which is used to create an index, which is then stored in storage media. The index is typically a table of alphanumeric terms with a corresponding list of the related documents or the location of the related documents (e.g., a pointer). An exemplary pointer is a Uniform Resource Locator (URL). The indexer 24 may build a hash table, in which a numerical value is attached to each of the terms. The database 22 is stored in a storage media, which typically includes the documents which are indexed by the indexer 24. The index may be included in the same storage media as the database 22 or in a different storage media. The storage media may be volatile or non-volatile memory that includes, for example, read only memory (ROM), random access memory (RAM), magnetic disk storage media, optical storage media, flash memory devices and zip drives.

The crawler 26 is a software program or software robot, which is typically used to build lists of the information found on Web sites. Another common term for the crawler 26 is a spider. The crawler 26 typically searches Web sites on the Internet and keeps track of the information located in its search and the location of the information.

The network 16 is a local area network (LAN), wide area network (WAN), a telephone network, such as the Public Switched Telephone Network (PSTN), an intranet, the Internet, or combinations thereof.

The plurality of client systems 18 may be mainframes, minicomputers, personal computers, laptops, personal digital assistants (PDA), cell phones, and the like. The plurality of client systems 18 are capable of being connected to the network 16. Web sites may also be located on the client systems 18. The web search application 28a-f is typically an Internet browser or other software.

The databases 30a-d are stored in storage media located at the server 20. The storage media may be volatile or non-volatile memory that includes, for example, read only memory (ROM), random access memory (RAM), magnetic disk storage media, optical storage media, flash memory devices and zip drives.

In use, the crawler 26 crawls websites, such as the websites of the plurality of client systems 18, to locate information on the web. The crawler 26 employs software robots to build lists of the information. The crawler 26 may include one or more crawlers to search the web. The crawler 26 typically extracts the information and stores it in the database 22. The indexer 24 creates an index of the information stored in the database 22. Alternatively, if a database 22 is not used, the indexer 24 creates an index of the located information and the location of the information on the Internet (typically a URL).

When a user of one of the plurality of client systems 18 enters a search on the web search application 28, the search is communicated to the search engine 14 over the network 16. The search engine 14 communicates the search to the server 20 at the search system 12. The server 20 matches the query to one or more of the databases 30a-d to identify a search result. The server 20 communicates the search result to the user via the search engine 14 and network 16.

Figure 2:
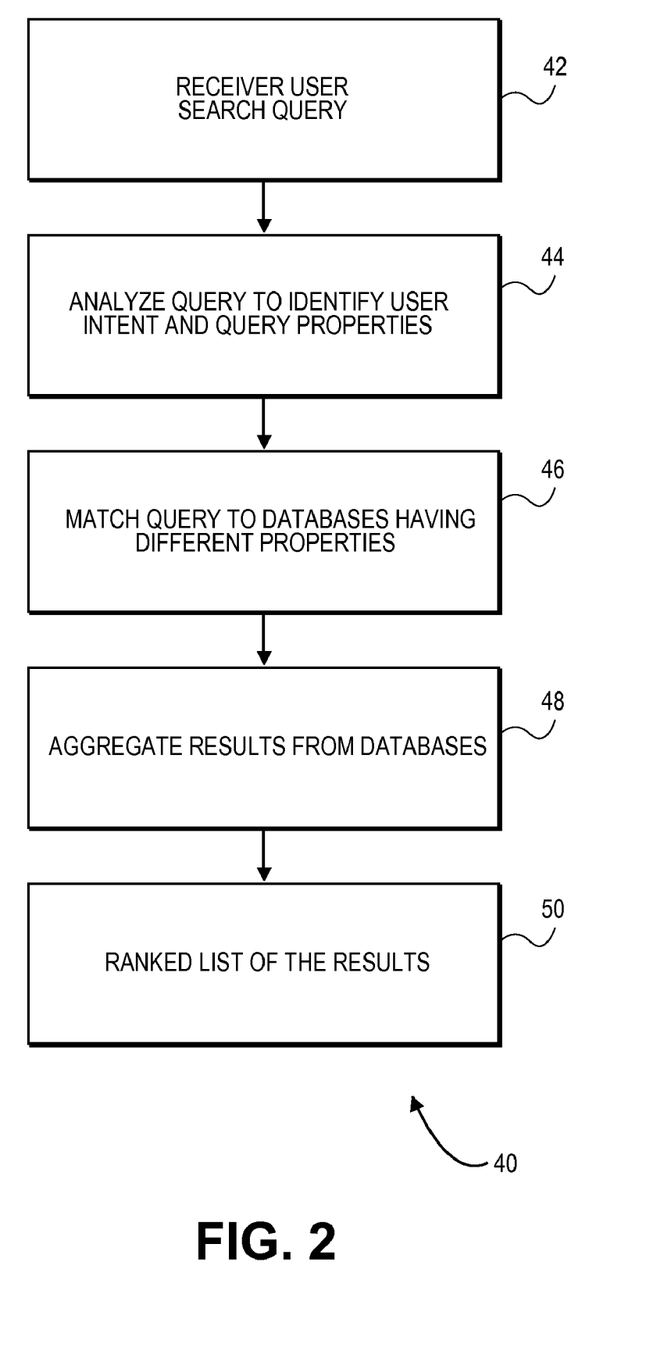
FIG. 2 is a flow diagram illustrating a method for analyzing queries and aggregating rankings.

FIG. 2 shows a method for analyzing user queries and aggregating search results. The process 40 begins at block 42 where a user search query is received. The user search query may be a natural language search query.

At block 44, an intention and property analysis is performed on the user search query. Any number of techniques may be used to identify the user intent. The user intent is quantified by identifying properties of the search query. Exemplary properties include location (e.g., local vs. national vs. global), time (e.g., recent vs. historical), commerce (e.g., buying/selling products/services), news, language, homepage, and the like.

At block 46, the query is matched with databases based on the intention and property analysis. The databases may be the databases 30a-d located at the server 20. Each of the databases is related to a different property or contains documents with multiple properties matchable with the selected property. Those databases relating to properties identified as query properties are searched.

At block 48, the results are aggregated. The search results from each of the databases searched may be combined to produce an aggregated, ranked list of search results. At block 50, the ranked list of the search results is provided to the user.

Figure 3:
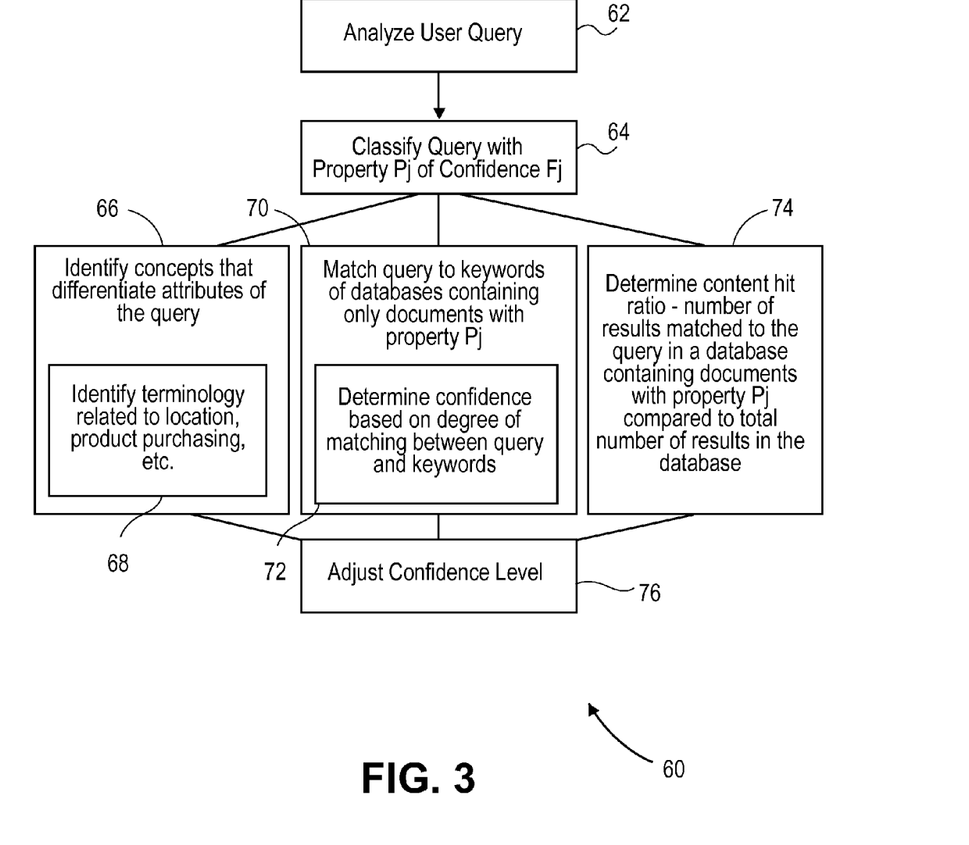
FIG. 3 is a flow diagram illustrating a method for analyzing queries.

FIG. 3 shows the process for identifying a user's intent and the property analysis of the user search query in more detail. The process 60 begins at block 62 where the user search query is analyzed. The query analysis is performed to classify the query. By classifying the query, the intention of the user and the type of content that should be matched and/or the ranking scheme can be identified.

At block 64, the query is classified by one or more properties $P_j$ and a confidence level $F_j$. Exemplary properties include location, time, commerce, news, language, homepage and the like.

The query can be classified by identifying concepts that differentiate attributes of the query (block 66). This can be done by identifying terminology relating to the property. (block 68). For example, if the user query is "Infiniti Silicon Valley," or "Who sells Infiniti's in the Silicon Valley?" relevant properties that may characterize the search include location (e.g., Silicon Valley indicates a region in northern California), commerce (e.g., Infiniti is a well-known brand of cars and 'sells' is a common commerce term), etc. Other well-known Natural Language Processing (NLP)-based text matching techniques may also be used to classify the query.

Alternatively, the query can be classified by matching the query to keywords of databases containing documents with the property $P_j$ (block 70). For example, a database relating to commerce may include the keywords: buy, sell, product, service, price, certain brand names, and the like. A query that includes terms matching (exact matches or similar matches) the keywords is likely to be related to that property. The confidence $F_j$ can be determined based on the degree of matching between the query and the keywords (block 72). An offline web data mining system can scan through all web sites on the Internet and identify home pages of persons or organizations. Keywords associated with each page may be stored with the database.

Alternatively, a content hit ratio can be identified. A content hit ratio is a relative measurement of hits based on a degree of matching towards each property. That is, the number of results matched to the query in a database containing documents with the property $P_j$ is compared to the total number of results in that database (block 74). The following formula can be used in this analysis:

$$\frac{H_j}{\sum_{k=1}^{n} H_k}$$

A high value exceeding a certain threshold indicates that it is more appropriate to match the query with database content of property $P_j$. For example, if a query is compared to all of the possible databases, and the hit rate is in a range of, for example, 1% to 60%, the databases with, for example, more than a 30% hit ratio are related to a relevant property for the query. The hit ratio threshold may be any value or range of values between 1% and 100%.

After the query has been classified with the property Pj and confidence $F_j$, the confidence level can, optionally, be adjusted (block 76). The confidence level can be adjusted, for example, by analyzing historical query logs. The historical query logs identify past search queries by any number of users, the search results provided, and may also identify the links/documents selected by the users.

Figure 4:
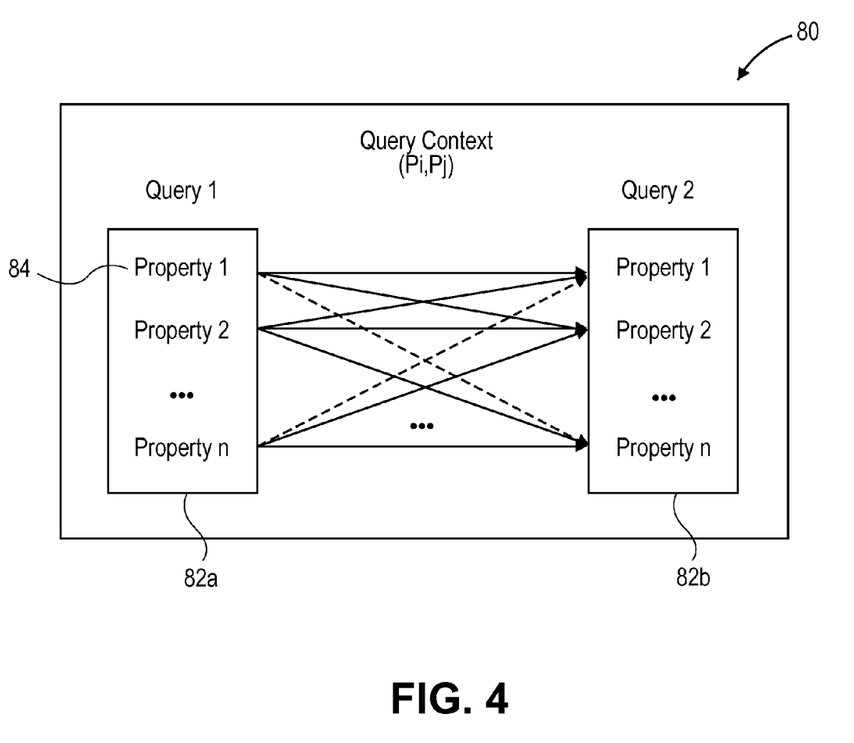
FIG. 4 is a block diagram illustrating a method for analyzing query context.

FIG. 4 shows an exemplary method for adjusting the confidence level $F_j$ 80. Using a historical query log, at least a first query 82a and second query 82b are examined within a user session.

A transition probability matrix is computed for property changes for two consecutive queries (e.g., query 82a and query 82b) from the same user. The transition probability matrix includes element $X_{i,j}$ which represents the probability the second query 82b has property $P_j$ 84 when the first query 82a has property $P_i$ 84 in a query context. This element $X_{i,j}$ may be represented by the following formula:

$$X_{i,j} \approx \frac{\text{\# query pairs with property pair } (P_i, P_j)}{\text{Total \# query pairs}} \cdot \frac{\text{Total \# queries}}{\text{\# queries with property } P_j}$$

The confidence level can be determined using the following equation:

$$F_j^{new} = \sum_i X_{i,j} \cdot F_i^{old}$$

For example, if the user first searches for Britney Spears and subsequently searches for Christina Aguilera, the relevant properties may include, for example, time and news. The probability that the search for Christina Aguilera includes similar properties is very high, and, therefore, the confidence level that the same ranking schemes should be used for the related queries can be increased. Thus, certain ranking schemes can be associated with certain properties, and the confidence that a particular ranking scheme should be associated with a particular property can be adjusted.

Figure 5:
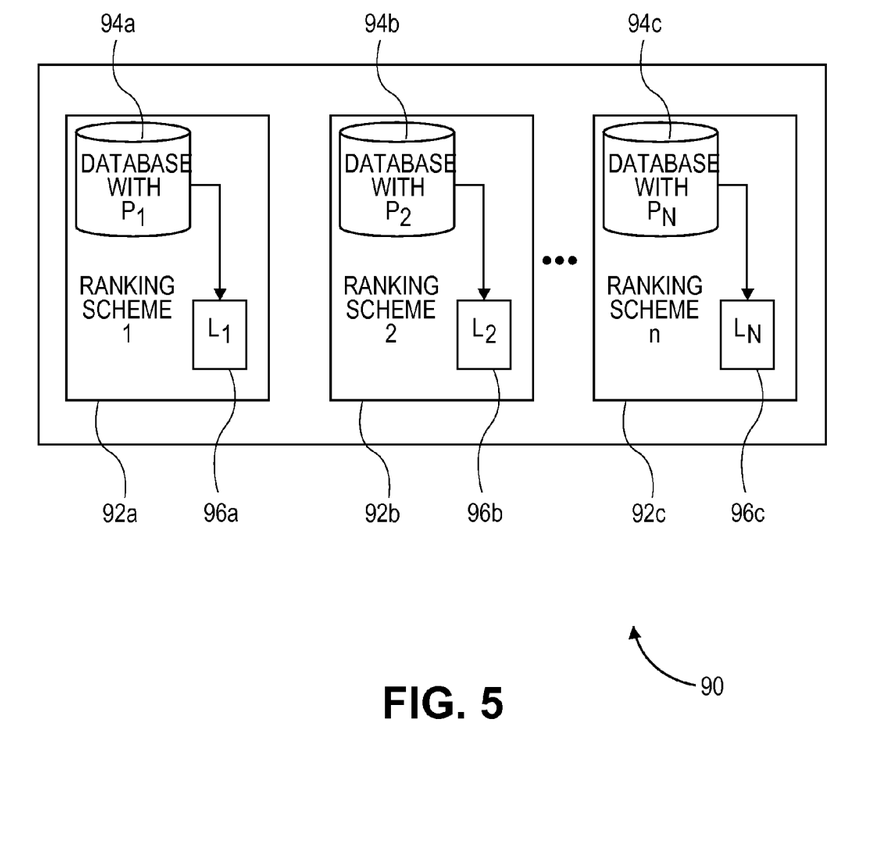
FIG. 5 is a block diagram illustrating a method for matching queries to databases.

FIG. 5 shows a method for matching the query with databases. The process 90 includes identifying a first ranking scheme 92a, second ranking scheme 92b, and any number of additional ranking schemes 92c. The ranking schemes represent different methodologies for ranking the documents in a database. Exemplary ranking schemes include link popularity, page popularity, frequency and location of words in a document, link analysis and the like.

Each ranking scheme 92 is associated with a database 94. The databases 94a-c each are related to a different property $P_1$, $P_2$ and $P_n$, respectively. The databases 94 include a plurality of documents having the associated property.

Exemplary properties include location, time, commerce, news, language, homepage and the like. Thus, the documents can be classified by the language of the documents, the geographical location of document publishers, the publishing period of a document, the extent of commercial content, the likelihood the site is a home page, etc.

A query having a set of attributes $P_i$ of confidence $F_i$, as determined with the user intent and property analysis described above with reference to FIG. 3, is matched against the databases 94 to produce a list 96. Each list 96a-c contains documents relating to each property associated with the database and ranked according to the associated ranking scheme 92.

In particular, for each property $P_j$ and its ranked page list $L_j$, a specific ranking score $S_{i,j}$ is provided for each matched document $d_i$, representing relevancy of the document with respect to the desired property. The ranking score $S_{i,j}$ is determined by the ranking scheme.

As described above, a confidence ratio $F_j$ is also determined for matching the intention of the query with the property $P_j$. A confidence ratio $G_{i,j}$ is also determined for classifying the document di for property $P_j$. The combined confidence for selecting such a document di for the property $P_j$ is $C_{i,j}=X(G_{i,j}, F_j)$. For example, $C_{i,j}=G_{i,j} \times F_j$. The combined confidence can be used to improve ranking of the documents.

Figure 6:
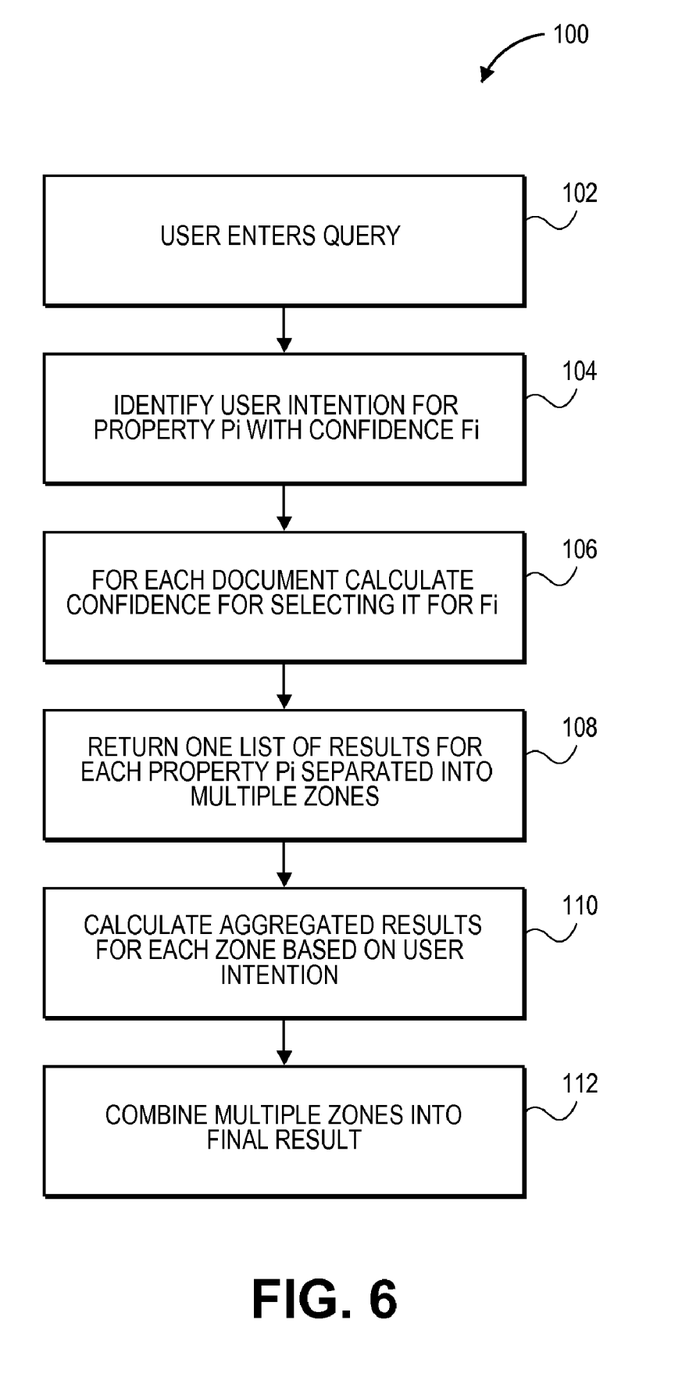
FIG. 6 is a flow diagram illustrating a method for providing search results in response to a user query.

FIG. 6 shows an alternative process for identifying user intention and identifying search results 100. The process 100 begins at block 102 where a user enters a search query.

User intention is identified for property $P_i$ with confidence $F_i$ (block 104). For each document, a confidence for selecting it for $F_i$ is calculated (block 106). The property $P_i$ and confidence $F_i$ can be identified as described above with reference to FIG. 3 (and, optionally, FIG. 4).

A list of results, separated into multiple zones, is returned for each property $P_i$ (block 108). The list of results is returned by matching the query to databases having the identified properties, as described above with reference to FIG. 5. The multiple zones represent tiers of quality. There may be any number of zones including as few as one zone. For example, the multiple zones may include a "highly relevant" zone, a "relevant" zone, and a "probably relevant" zone. In general, for each list $L_j$, a criterion can be used to divide the list into t zones. The sublist in zone k for list $L_j$ is $L_{j,k}$. Each sublist $L_{j,k}$ includes all of the documents that match the query in that zone.

Aggregated results are calculated for each zone based on user intention (block 110). Results from each list are selected and ranked at each zone. For each zone k, there are n sublists: $L_{1,k}, L_{2,k}, \ldots, L_{n,k}$. The documents may be sorted based on an aggregated ranking score. The aggregated ranking score for $d_i$ at zone k is:

$$R_{i,k} = \sum_{j=1}^{n} W_j * C_{i,j} * S_{i,j}^k$$

where $W_j$ is a weighting factor to be adjusted based on the final ranking need, $C_{i,j}$ is the combined confidence for selecting document $d_i$ for property $P_j$, and $S_{i,j}^k$ is a ranking score in the list $L_j$ for document $d_i$. For each zone, the results from each sublist are combined.

At block 112, the multiple zones are combined into a final result. The combined lists from each zone are then combined together into a final result including all the results from all the lists organized by the zones. This approach allows matched results with different properties and confidence scores to be selected and combined to produce an aggregated list. In one embodiment, the system may set a limit to select the top k results to present to the user, based on application needs.

Figure 7:
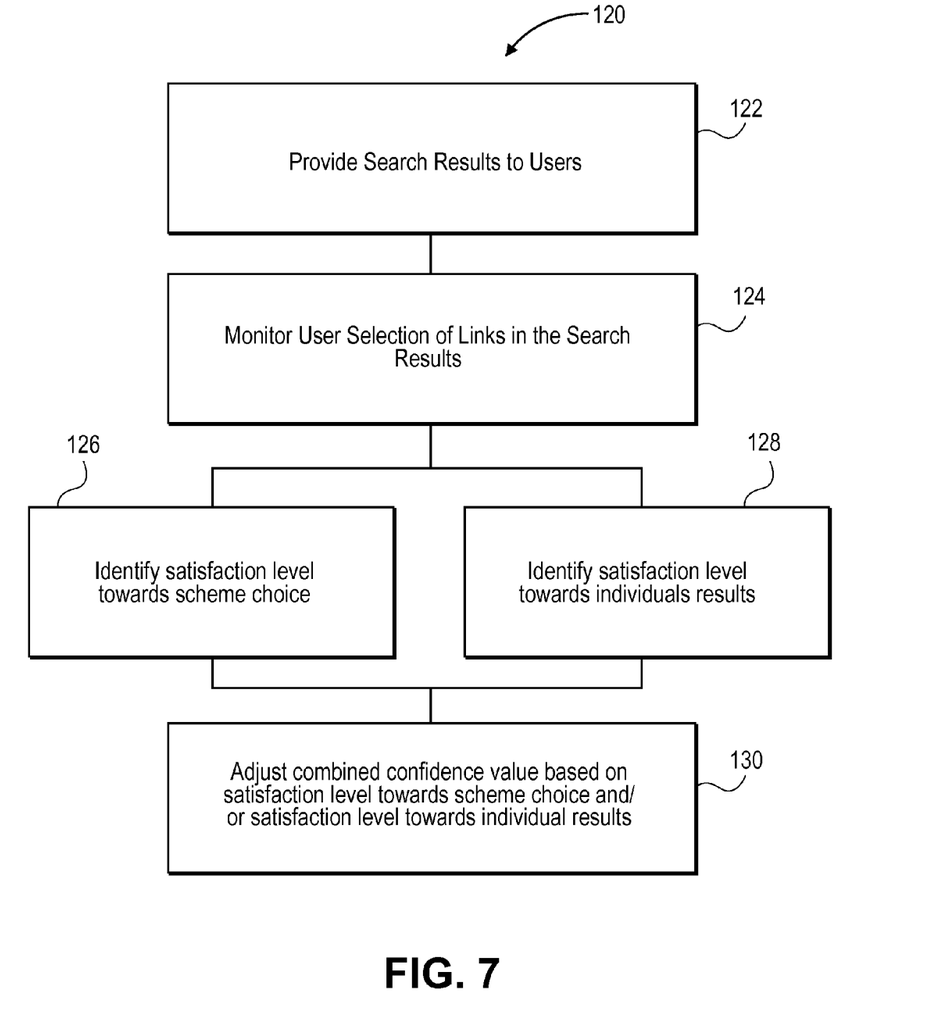
FIG. 7 is a flow diagram illustrating a method for optimizing search results using user feedback.

FIG. 7 shows a detailed method for optimizing search results 120. At block 122, search results are provided to a user. At block 124, user's selection of links or documents in the search results are monitored.

$$\sum_{j=1}^{n} W_j * C_{i,j} * S_{i,j}^k$$

At block 126, the satisfaction level towards a scheme choice is identified. Exemplary scheme choices include link popularity, page popularity, frequency and location of words in a document, link analysis and the like. The satisfaction level towards scheme choice can be identified by selecting results from different result lists $L_j$ and computing the satisfactory degree $B_j$ to the use of the list $L_j$. The satisfactory degree $B_j$ with respect to the use of list $L_j$, measured by the percentage of times that the list $L_j$ contributes to the final ranking which has been confirmed by users, can be identified by the following formula:

$$B_j = \frac{\sum_{s=1}^{m} \sum_{t=1}^{h_s} F(T_{s,t}, j)}{\sum_{s=1}^{m} h_s}$$

where $F(T_{s,t}, j)=1$ if $j \in T_{s,t}$; otherwise 0, $T_{s,t}$ is the set of list names which have contributed positively to ranking position t for the s-th query in the log, $h_s$ is the number of results selected by users for a query, m is the number of times the same query was asked in the log, and $$B_{avg} = \frac{\sum_{k=1}^{n} B_j}{n} \cdot B_{max} = \text{Max}_{k=1}^n B_j$$

where n is the number of possible properties. If the absolute value of $(B_j - B_{avg})/B_{max}$ exceeds a threshold, then the feedback is strong enough to influence a new ranking. The adjusted weighting factor with the feedback can be:

$$Q_j = W_j \left(1 + \left(\frac{B_j - B_{avg}}{B_{max}}\right)\right)^{2\alpha+1}$$

if $$\frac{B_j - B_{avg}}{B_{max}} > \delta,$$

where $\delta$ is a threshold.

At block 128, the satisfaction level towards individual results is identified. The satisfaction level can be determined by calculating a satisfactory degree $V_i$, which is assessed for each individual result for document $d_i$.

$$V_i = \frac{\sum_{s=1}^{m} \sum_{t=1}^{h_s} Z(T_{s,t}, d_i)}{m}$$

where $Z(T_{s,t}, d_i)=1$ if $D(T_{s,t})=d_i$; otherwise 0.

At block 130, the combined confidence level $C_{i,j}$ can be adjusted based on the satisfaction level towards the scheme choice and/or the satisfaction level towards individual results. The combined confidence level $C_{i,j}$ can be adjusted as follows:

$$U_{i,j} = C_{i,j} * \beta + V_i * (1-\beta)$$

The final ranking with feedback for zone k can be computed as follows:

$$R_{i,k} = \sum_{j=1}^{n} Q_j * U_{i,j} * S_{i,j}$$

For the results clicked by a user, an algorithmic choice may be kept in the query log history. Thus, personalized confidence scores can be identified to improve ranking.

Figure 8:
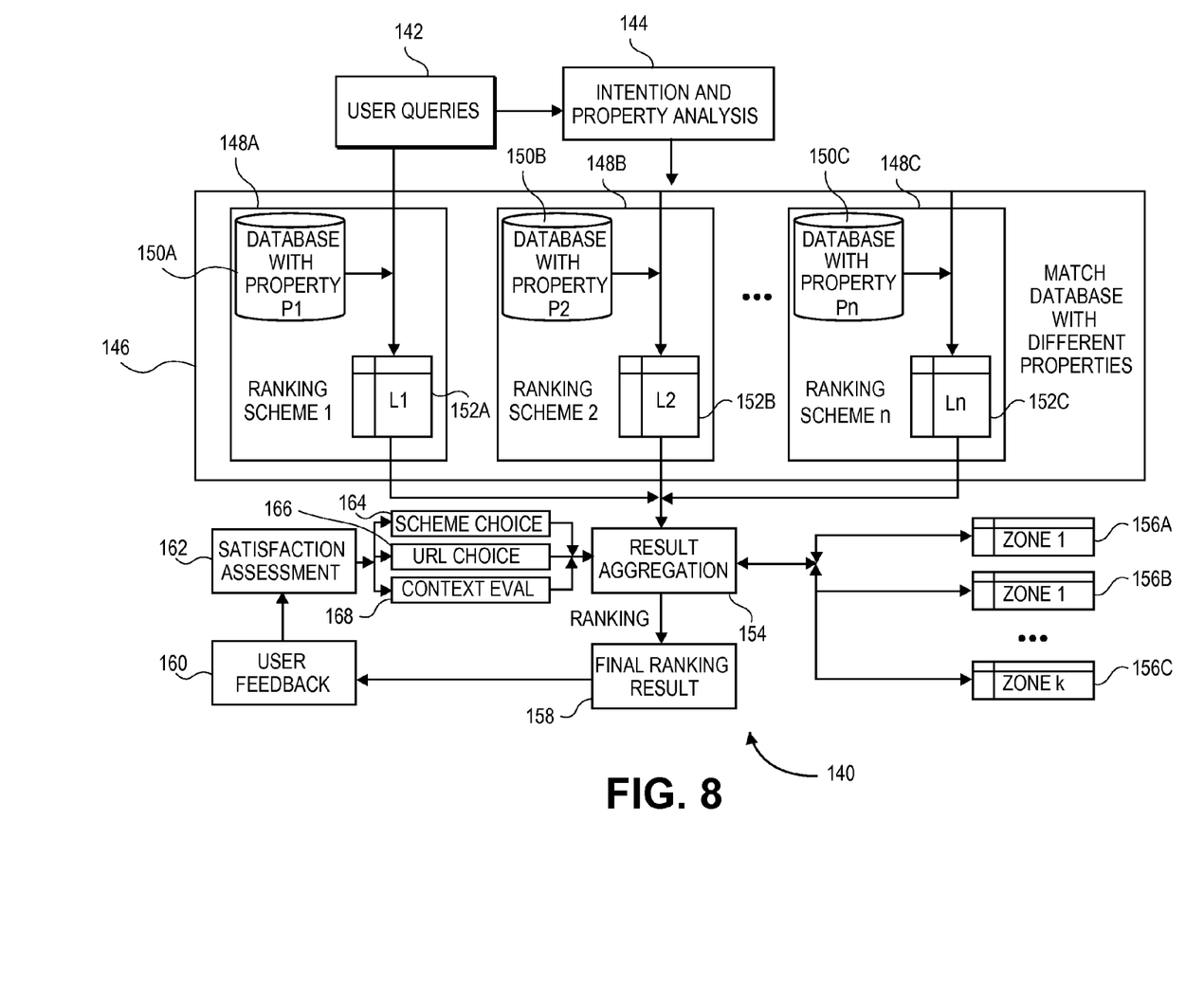
FIG. 8 is a block diagram illustrating a method for analyzing queries, aggregating rankings and optimizing results.

FIG. 8 shows a detailed method for analyzing a query, aggregating results and optimizing the results with user feedback 140. The process 140 begins at block 142 where a user query is received.

At block 144, an intention and property analysis is performed. The intention and property analysis is performed as described above with reference to FIG. 3 (and, optionally, FIG. 4).

At block 146, the query is matched against the databases having different properties. As described above with reference to FIG. 5, a first ranking schema 148*a*, second ranking schema 148*b* and any additional number of ranking schemas 148*c* may be included. Each ranking schema 148 includes a respective database 150*a*, 150*b* and 150*c* that relates to a specific property. Results in the database that match the query are presented in respective lists 152a, 152b and 152c.

At block 154, the results are aggregated. In one embodiment, the results are aggregated by zones 156a, 156b, 156c, as described above with reference to FIG. 6.

At block 158, the aggregated ranking results are presented to the user, as described above with reference to FIG. 6.

At block 160, user feedback may be monitored. At block 162, a satisfaction assessment may be performed. The user feedback and satisfaction assessment are performed as described above with reference to FIG. 7. In particular, the schema choice (block 164), URL (document) choice (block 166) and context evaluation (block 168) can be monitored and assessed, as described above with reference to FIG. 7. The assessment may be used to modify the result aggregation (block 154).

Systems and methods described herein are advantageous because they produce better search results. For example, the systems and methods described herein can automatically determine whether the search query relates to a local search vs. a global search, commercial products, temporal content, mixed languages, etc. Systems and methods described herein also provide for personalization of search methods.

Multiple ranking schemes can be used with the same database, allowing a combination from different ranking strategies and properties. The results with the different ranking strategies can then be aggregated.

The zoning-based aggregation scheme allows for diversification of the results and ensures that documents from each list have a chance to appear in the top positions if they are highly relevant. Thus, one list does not necessarily dominate the final ranking.

The foregoing description with attached drawings is only illustrative of possible embodiments of the described method and should only be construed as such. Other persons of ordinary skill in the art will realize that many other specific embodiments are possible that fall within the scope and spirit of the present idea. The scope of the invention is indicated by the following claims rather than by the foregoing description. Any and all modifications which come within the meaning and range of equivalency of the following claims are to be considered within their scope.

What is claimed:

1. A method for generating and providing a search results list to a user in response to a search query issued by the user, the method comprising:
   receiving, by a search engine, a signal including the search query issued by the user;
   analyzing, by a server, the search query to identify a plurality of properties of the search query;
   identifying, by the server, a separate ranking scheme for ranking a set of search results stored in a plurality of databases resident in the server, wherein each ranking scheme indicates a different methodology for ranking the set of search results and the set of search results and the ranking scheme is different for each database;
   determining a relevance factor of each scheme based on a relevance of each ranking scheme to each property of the search query;
   ranking, by the server, the set of search results stored in each database of the plurality of databases using a ranking scheme identified for each respective database;
   storing, by the server, the ranking scheme and the set of ranked search results in each respective database;
   identifying, by the server, a plurality of search results that match one or more properties of the search query such that each search result is identified from a different stored set of ranked search results;
   sorting, by the server, the plurality of search results according to the relevance factor of a scheme associated with each respective search result included in the plurality of search results;
   generating, by the server, a search results list using the sorted plurality of search results; and
   providing, by the server, the generated search results list to the user.

2. The method of claim 1, wherein analyzing the search query to identify a plurality of properties comprises:
   identifying concepts that differentiate attributes of the query.

3. The method of claim 1, wherein analyzing the search query to identify a plurality of properties comprises:
   matching the search query to keywords of the databases.

4. The method of claim 1, wherein analyzing the search query to identify a plurality of properties comprises:
   identifying search results in a plurality of databases that match the search query, wherein each database of the plurality of databases is associated with a different ranking scheme;
   generating a content hit ratio by comparing the total number of search results in the database with the number of search results that match the search query identified in the database; and
   determining that the search query includes a property of the database when the content hit ratio exceeds a threshold.

5. The method of claim 1, wherein the properties are selected from the group consisting of location, time, commerce, news, language and homepage.

6. The method of claim 5, wherein the properties are determined through a query and log analysis.

7. The method of claim 1, wherein the search query is a natural language query.

8. The method of claim 1, aggregating the search results to produce a search results list comprises:
   sorting each of the search results from each scheme into one of a plurality of zones;
   combining all of the search results sorted into a zone; and
   combining the plurality of zones into a list of search results.

9. The method of claim 8, further comprising:
   selecting a portion of the search results to present to the user, wherein the portion presented corresponds to search results sorted into one of the plurality of zones.

10. The method of claim 9, further comprising:
    ranking the zones; and
    selecting a portion of search results that corresponds to the highest ranked zone.

11. The method of claim 1, further comprising:
    receiving feedback from a user regarding the relevance of the provided search results; and
    optimizing the relevance factor determination and sorting for future determination of relevance factors for each scheme based on the received user feedback.

12. The method of claim 11, wherein the optimization comprises:
    assessing a user's satisfaction with each scheme based on the received feedback.

13. The method of claim 11, wherein the optimization comprises:
    assessing a user's satisfaction with a search result in the search results list based on the received feedback.

14. The method of claim 1, wherein each scheme has a database associated therewith.

15. A search system comprising:
a search engine, wherein the search engine receives a signal including a search query;
a plurality of databases, wherein each database stores a set of ranked search results and a ranking scheme used to rank the set of search results, wherein each ranking scheme indicates a different methodology for ranking the set of search results and the ranking scheme is different for each database included in the plurality; and
a server to analyze the search query to identify a plurality of properties of the search query, identify the a separate ranking scheme for ranking a set of search results stored in a plurality of databases resident in the server, wherein the set of search results and the ranking scheme is different for each database, determine a relevance factor of each scheme based a relevance of each ranking scheme to each property of the search query rank the set search results stored in each database of the plurality of databases using a ranking scheme identified for each respective database, identify, by the server, a plurality of search results that match one or more properties of the search query such that each search result is identified from a different stored set of ranked search results, sort the plurality of search results according to the relevance factor of a scheme associated with each respective search result included in the plurality of search results, and generate a search results list using the sorted plurality of search results.

16. The search system of claim 15, wherein the search engine provides the search results list to a user.

17. The search system of claim 15, wherein each of the plurality of databases are associated with one of the plurality of properties associated therewith.

18. The search system of claim 15, wherein the server divides each of the search results from each database into a plurality of zones, combines each of the search results from each database in each zone, and combines the search results from each zone.

* * * * *